United States Patent [19]

Uno et al.

[11] Patent Number: 4,901,811
[45] Date of Patent: Feb. 20, 1990

[54] VEHICLE STEERING SYSTEM FOR ADJUSTING TIRE CHARACTERISTIC

[75] Inventors: Takaaki Uno, Kawasaki; Hiroyasu Kan, Sagamihara; Hiroshi Tonomura, Yokosuka, all of Japan

[73] Assignee: Nissan Motor Co., Ltd., Japan

[21] Appl. No.: 196,217

[22] Filed: May 13, 1988

[30] Foreign Application Priority Data

May 14, 1987 [JP] Japan .................................. 62-115887
May 25, 1987 [JP] Japan .................................. 62-127332

[51] Int. Cl.⁴ .......................... B62D 5/06; B62D 6/04
[52] U.S. Cl. .................................... 180/140; 180/142; 280/91
[58] Field of Search ...................... 180/140, 141, 142; 280/91, 688

[56] References Cited

U.S. PATENT DOCUMENTS

| 4,579,186 | 4/1986 | Uno et al. ........................... 180/140 |
| 4,586,581 | 5/1986 | Shibahata et al. ................. 180/140 |
| 4,588,039 | 5/1986 | Uno et al. ........................... 180/140 |

FOREIGN PATENT DOCUMENTS

| 3300640 | 7/1984 | Fed. Rep. of Germany ...... 180/141 |
| 60-191875 | 3/1984 | Japan .................................. 180/141 |
| 60-85062 | 5/1985 | Japan . |

*Primary Examiner*—John A. Pekar
*Attorney, Agent, or Firm*—Leydig, Voit & Mayer

[57] ABSTRACT

A vehicle has rear wheels each equipped with a rear tire having a tire characteristic which is different from that of front wheels, and which is suitable for one cornering condition, for example, a condition in which a lateral acceleation is high, and a steering system which steers the rear wheels so as to remedy the deficiency of the tires of the rear wheels in another cornering conditions.

16 Claims, 7 Drawing Sheets

VEHICLE STEERING SYSTEM FOR ADJUSTING TIRE CHARACTERISTIC

BACKGROUND OF THE INVENTION

The present invention relates to a four wheel steering system for improving cornering performances of a vehicle.

Conventional four wheel steering systems are disclosed in a plurality of publications. Examples are Japanese patent provisional publication no. 60-85062, and U.S. Pat. Nos. 4,588,039; 4,586,581; and 4,579,186. Steering systems of these examples are designed to steer rear wheels in response to steering operation of front wheels on the premise that all of the front and rear wheels are equipped with tires of the same characteristic.

In general, a tire exhibits a characteristic of a cornering force CF versus a tire slip angle, as shown in FIG. 9. A cornering power CP indicated in FIG. 9 is a rate of rise of the cornering force with respect to increase in the tire slip angle, usually evaluated at or near zero slip angle. The cornering force increases with increase of the tire slip angle, and reaches a maximum value at a maximum cornering force generating slip angle $\alpha_1$. From the nature of a tire, the maximum cornering force generating slip angle $\alpha_1$ is decreased when the cornering power CP is increased, as shown in by a solid line in FIG. 9, and the cornering power Cp is decreased when the maximum cornering force generating slip angle is increased, as shown by a one dot chain line in FIG. 9.

A vehicle equipped with tires having a high cornering power is advantageous in that the front wheels can improve the steering response and the rear wheels can improve cornering performances in a cornering operation in which a vehicle lateral acceleration or the tire slip angle remains low. However, in a cornering operation producing a high lateral acceleration or a great tire slip angle, the ability of grip of the tire readily becomes insufficient especially in the rear wheels because of the maximum cornering force generating slip angle being small, so that the vehicle easily falls into spin.

On the other hand, a vehicle equipped with tires of a low cornering power is advantageous in the cornering operation accompanied by a high lateral acceleration or a great tire slip angle. Because the maximum cornering force generating tire slip angle of such tires is high, the possibility of shortage of the grip in the rear wheels is reduced. Therefore, the vehicle having tires of a low cornering power can prevent spin-out, and widen a permissible range of the yaw angle. However, in the state wherein the lateral acceleration or the slip angle is at a low level, the insufficiency of the cornering power impairs the steering response in the front wheels, and the cornering performances in the rear wheels.

Therefore, it is desirable to provide the front wheels with a relatively high cornering power, and to provide the rear wheels with a relatively high cornering power during a cornering operation at low lateral acceleration or small tire slip angle, and with a relatively low cornering power during a cornering operation at high lateral acceleration or great tire slip angle.

However, the conventional steering systems are not arranged to adjust the tire characteristics in accordance with a cornering condition of the vehicle, and the tire characteristic is appropriate only in a limited operating condition.

Especially when all the wheels are equipped with tires having a great cornering power to meet the requirements on the front wheels, the rear wheel tires readily become insufficient in ability of grip during increase of the tire slip angle, and increases the possibility of spin of the vehicle. In this case, the cornering force drops rapidly after the cornering force is increased to a maximum by increase of the slip angle. Therefore, the vehicle changes its behavior so rapidly at an initial stage of spin, that it is difficult to control the direction of the vehicle by steering.

SUMMARY OF THE INVENTION

It is an object of the present invention to provide a vehicle, or a steering system of a vehicle, which can always provide satisfactory tire performances.

According to the present invention, a vehicle comprises front wheels each equipped with a front tire, rear wheels each equipped with a rear tire having a rear tire characteristic which is different from a front tire characteristic, a rear wheel steering system for steering said rear wheels, and controlling means for adjusting said rear tire characteristic by steering said rear wheels in a predetermined first cornering condition of the vehicle.

DETAILED DESCRIPTION OF THE INVENTION

Figure 1:
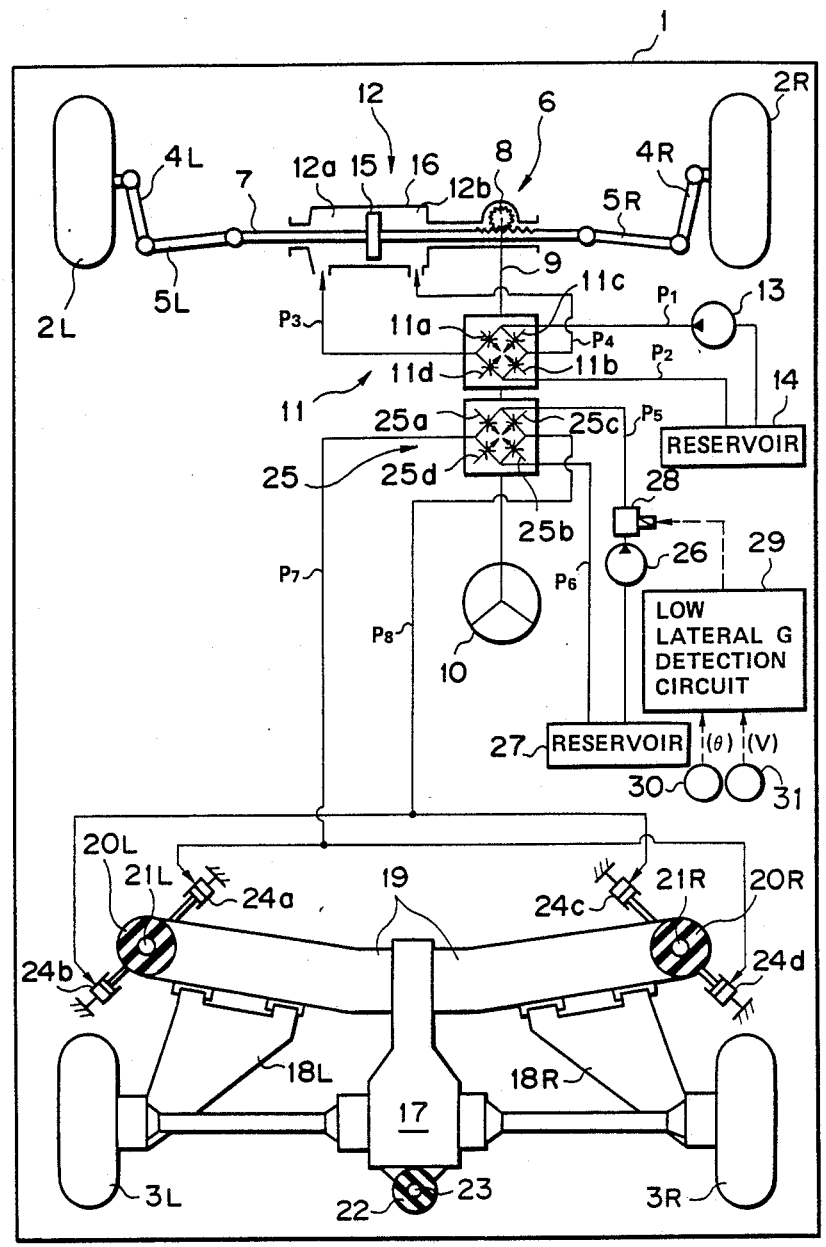
FIG. 1 is a schematic view of a vehicle for showing a first embodiment of the present invention.

A first embodiment of the present invention is shown in FIG. 1.

A vehicle shown in FIG. 1 has a vehicle body 1, left and right front wheels 2L and 2R, and left and right rear wheels 3L and 3R.

In a front steering system, the left and right front wheels 2L and 2R are connected with a rack 7 of a steering gear 6, respectively, through left and right knuckle (steering) arms 4L and 4R and left and right side rods 5L and 5R. A pinion 8 of the steering gear 6 is connected with a steering wheel 10 through a steering shaft 9.

The front steering system of this embodiment is power-assisted by a power steering control valve 11 provided in connection with the steering shaft 9, and a power cylinder 12 provided in connection with the steering gear 6. The power steering control valve 11 has four variable orifices 11a–11d operated in response to steering load. A hydraulic pressure source has a pump 13, a reservoir 14, a supply passage $P_1$ connected to a branch point between the variable orifices 11a and 11c of the control valve 11, and a drain passage $P_2$ connected to a branch point between the variable orifices 11b and 11d. A left passage $P_3$ connects a branch point between the variable orifices 11a and 11d to a left power chamber 12a of the power cylinder 12. A right passage $P_4$ connects a branch point between the variable orifices 11b and 11c to a right power chamber 12b of the power cylinder 12. The power cylinder 12 has a piston 15 and a stationary cylinder body 16. The piston 15 is fixedly mounted on the rack 7, and slidably received in the cylinder body 16 so that the left and right power chambers 12a and 12b are separated by the piston 15.

A rear steering system of this embodiment has left and right semi-trailing arms 18L and 18R which are pivotally supported on a suspension member 19. The left and right rear wheels 3L and 3R are supported by the left and right semi-trailing arms 18L and 18R, respectively, and connected drivingly with a differential gear 17. The differential gear 17 and the suspension member 19 are combined into an integral unit. The suspension member 19 is resiliently supported at both ends on the vehicle body 1 through left and right insulator rubbers 20L and 20R and left and right vertical pins 21L and 21R. The differential gear 17 is pivotally supported on the vehicle body 1 through an insulator rubber 22 and a vertical pin 23.

The rear steering system further includes actuators 24a–24d for causing the suspension member 19 to swing about the pin 23 by deforming the insulator rubbers 20L and 20R. This rear steering system steers the rear wheels 3L and 3R by deforming the insulator rubbers 20L and 20R with the actuators 24a–24d, and causing the suspension member 19, the differential gear 17, the semi-trailing arms 18L and 18R and the rear wheels 3L and 3R to swing together about the pin 23. The actuators 24a–24d are controlled by a rear steering control valve 25 provided in connection with the steering shaft 8.

The rear steering control valve 25 has four variable orifices 25a–25d which are operated in response to the steering load. The rear steering control valve 25 is substantially the same in structure as the power steering control valve 11. A branch point between the variable orifices 25a and 25c is connected with a supply $P_5$ of a hydraulic pressure source including a pump 26 and a reservoir 27. A branch point between the variable orifices 25b and 25d is connected with a drain passage $P_6$ of the pressure source of the rear steering system. A branch point between the variable orifices 25a and 25d is connected to the actuators 24a and 24d by a left passage $P_7$. A branch point between the variable orifices 25b and 25c is connected to the actuators 24b and 24c by a right passage $P_8$.

Similar front and rear wheel steering systems are disclosed in a plurality of publications, for example, U.S. Pat. Nos. 4,588,039; 4,579,186 and 4,586,581.

Figure 2:
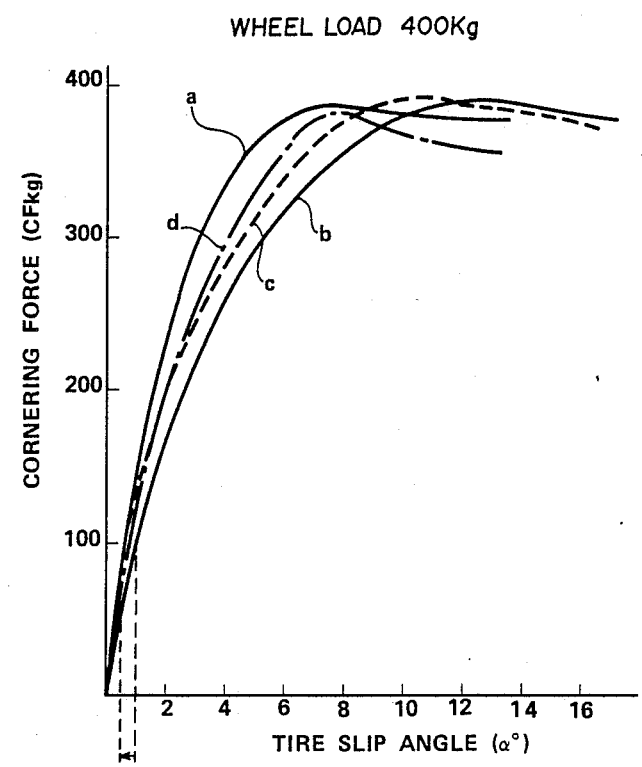
FIG. 2 is a graph showing tire characteristics employed in the first embodiment.

In the present invention, each of the front wheels 2L and 2R is equipped with a tire having a characteristic shown by a line a in FIG. 2. That is, the tires of the front wheels 2L and 2R are relatively small in the maximum cornering force generating slip angle at which the cornering force is increased to a maximum, and relatively great in the cornering power. Accordingly, the tires of the front wheels meet the above-mentioned requirements on them, and improve the steering response of the vehicle.

Each of the rear wheels 3L and 3R of this embodiment is equipped with a tire having a characteristic shown by a line b of FIG. 2. The maximum cornering force generating slip angle of the characteristic b of the rear tires is greater than that of the characteristic a of the front tires, and the cornering power of the characteristic b of the rear tires is smaller than that of the characteristic of the front tires. Accordingly, the tires of the rear wheels 3L and 3R of this embodiment can satisfy the tire demands in cornering at high lateral acceleration, and prevent spin of the vehicle due to shortage of tire-to-road adhesion in a high lateral acceleration range.

Figure 3:
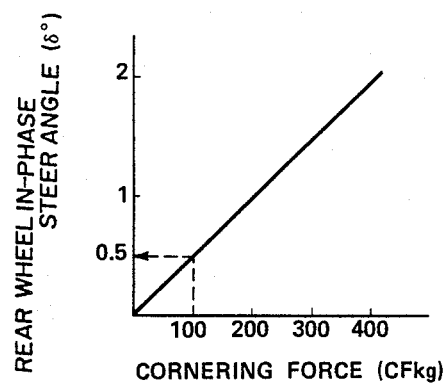
FIG. 3 is a graph showing a relationship between the cornering force and the rear wheel steer angle, used to determine the rear wheel steer angle in the first embodiment.

However, the rear wheel tires of this embodiment per se cannot provide satisfactory performances in cornering at low lateral acceleration because their cornering power is low. Therefore, the control system of this embodiment is designed to adjust the characteristic of the rear wheel tires in a range in which the rear wheel cornering force CF is equal to or lower than 100 kg so that the rear wheel tire characteristic approaches the front wheel tire characteristic a. In this embodiment, the control system steers the rear wheels in an in-phase direction, that is the same direction as the steering direction of the front wheels, and makes the rear wheel steer angle equal to 0.5 degree, as shown in FIG. 3, so as to make the tire slip angle of the rear wheel tire characteristic equal to the tire slip angle of the front wheel tire characteristic when the cornering force CF is equal to 100 kg, and so as to shift the rear wheel tire characteristic from the curve b in FIG. 2 to an equivalent curve c having a low maximum cornering force generating slip angle and a high cornering power.

To realize this object, a flow control valve 28 is disposed in the supply passage $P_5$. The control valve 28 is an electromagnetic valve which normally cuts off the passage $P_5$ from the pump 26, and instead leads to a drain port (not shown).

A low lateral G detection circuit 29 is connected with the control valve 28, and arranged to turn on the control valve 28 by sending a signal. In this embodiment, there are further provided a steering angle sensor 30 for sensing a steering angle $\theta$ of the steering wheel 10 and a vehicle speed sensor 31 for sensing a vehicle speed V of the vehicle. Both sensors 30 and 31 are connected with the low lateral G detection circuit 29. By using the steering angle $\theta$ and the vehicle speed V, the low lateral acceleration detection circuit 29 determines whether the vehicle is in a cornering motion in which the cornering force CF is equal to or lower than 100 kg and the lateral acceleration is low. If it is, the low lateral acceleration detection circuit 29 turns on the control valve 28. Therefore, the control valve 28 cuts off the passage $P_5$ from the drain port, and connects the passage $P_5$ with the pump 26, so that the oil discharged from the pump 26 is supplied into the passage $P_5$. In this way, the low lateral acceleration detection circuit 29 of the first embodiment steers the rear wheels 3L and 3R through the rear wheel steering control valve 25 and the actuators 24a–24d in the cornering operation in which the lateral acceleration is low. In this embodiment, the strokes of the actuators 24a–24d are limited so that the rear wheel steer angle becomes equal to 0.5° when the rear wheels are steered.

The low lateral G detection circuit 29 of this embodiment is arranged to determine a vehicle motion variable representing a turning behavior of the vehicle, such as the lateral acceleration or the rear wheel cornering force or the front wheel cornering force, from the steering angle $\theta$ and the vehicle speed V, and adjust the rear wheel tire characteristic by steering the rear wheels when the motion variable is equal to or lower than a predetermined value. For example, the lateral acceleration is determined by;

$$\text{Lateral acceleration} = \frac{\sin(\theta/N)}{l} V^2$$

wherein N is a steering gear ration and l is a wheel base of the vehicle.

It is possible to prevent an abrupt change in the rear wheel tire characteristic and adjust the rear wheel tire characteristic smoothly by varying the rear wheel steer angle continuously and smoothly in accordance with the lateral acceleration or the front or rear wheel cornering force.

The control system of the first embodiment is operated as follows:

While the steering wheel 10 is held at a neutral position, the control valve 11 is held in a position in which the opening degrees of all the variable orifices 11a–11d are equal to one another, so that all the oil supplied from the pump 13 into the passage $P_1$ is returned to the reservoir 14 through the passage $P_2$, and the passages $P_3$ and $P_4$ are held in a non-pressure state. Therefore, the power cylinder 12 is not actuated, and the front wheels 2L and 2R are held in the straight ahead position. Thus, the vehicle is driven straight ahead.

When the steering wheel 10 is turned to steer the front wheels 2L and 2R through the steering gear 6 in a rightward direction, for example, this movement of the steering wheel 10 causes the control valve 11 to decrease the opening degrees of the variable orifices 11a and 11b and to increase the opening degrees of the variable orifices 11c and 11d, so that a pressure is developed in the passage $P_4$, and the passage $P_3$ is drained. Therefore, the piston 15 of the power cylinder 12 is urged leftwardly in FIG. 1, and assists the front wheel steering system in steering the front wheels 2L and 2R rightwardly. In a leftward steering, the control valve 11 increases the pressure in the passage $P_3$ and drains the passage $P_4$ by increasing the opening degrees of the variable orifices 11a and 11b, and decreasing the opening degrees of the variable orifices 11c and 11d. Therefore, the piston 15 is urged in the rightward direction in FIG. 1, and the driver can lightly steer the front wheels 2L and 2R to the left.

When the lateral acceleration is low, the low lateral G detection circuit 29 puts the control valve 28 in its on state, and allows the supply of the oil from the pump 26 to the passage $P_5$. In this state, the rear wheel steering control valve 25 functions in the same manner as the power steering control valve 11. When the steering wheel 10 is not turned, and the front wheels are not steered, the rear steering control valve 25 holds the passages $P_7$ and $P_8$ in the non-pressure state, and all the actuators 24a–24d in an inoperative state, so that the rear wheels are held in the straight ahead position. When the steering wheel 10 is turned to steer the front wheels to the right, the control valve 25 increases the pressure in the passage $P_8$ and drains the passage $P_7$. Therefore, the actuators 24b and 24c move to their limit positions and make the rear wheel steer angle of the rear wheels 3L and 3R equal to 0.5 degree by steering the rear wheels in the in-phase direction, that is the same rightward direction. When the front wheels 2L and 2R are steered to the left by turning the steering wheel 10, the control valve 25 increases the pressure in the passage $P_7$ and drains the passage $P_8$. Therefore, the rear wheel steering system moves the actuators 24a and 24d to their limit positions and steers the rear wheels in the in-phase direction, i.e. the leftward direction, through 0.5°.

In this way, the control system of this embodiment varies the tire characteristic of the rear wheels from the characteristic b of FIG. 2 to the characteristic c having a smaller maximum cornering force generating slip angle and a greater cornering power, by steering the rear wheels through 0.5 degree in the in-phase direction when the vehicle lateral acceleration is low. Therefore, this control system can provide satisfactory cornering performances by combining the optimized characteristic of the rear wheel tires with the highly satisfactory characteristic a of the front wheel tires.

When, on the other hand, the lateral acceleration is high, the low lateral acceleration detection circuit 29 holds the passage $P_5$ in the non-pressure state by switching off the control valve 28. Therefore, the rear wheels 3L and 3R are not steered at all but held at the straight ahead position during cornering of a high lateral acceleration, so that the tire characteristic of the rear wheels remains equal to the characteristic b having a large maximum cornering force generating slip angle and a small cornering power, as shown in FIG. 2. In this way, the control system of the first embodiment can reduce the possibility of spin of the vehicle even if the lateral acceleration is high.

It is desirable to make the cornering power of the front wheel tires smaller than that of the rear wheel tires in order to improve the stability of the vehicle during driving at low lateral acceleration. Therefore, it is optional to make the cornering power of the front wheel tires smaller than that of the equivalent curve c of the rear wheel tires by varying the equivalent curve of the tire characteristic of the front wheels to a curve d shown in FIG. 2 with a means for decreasing a steering stiffness.

Figure 4:
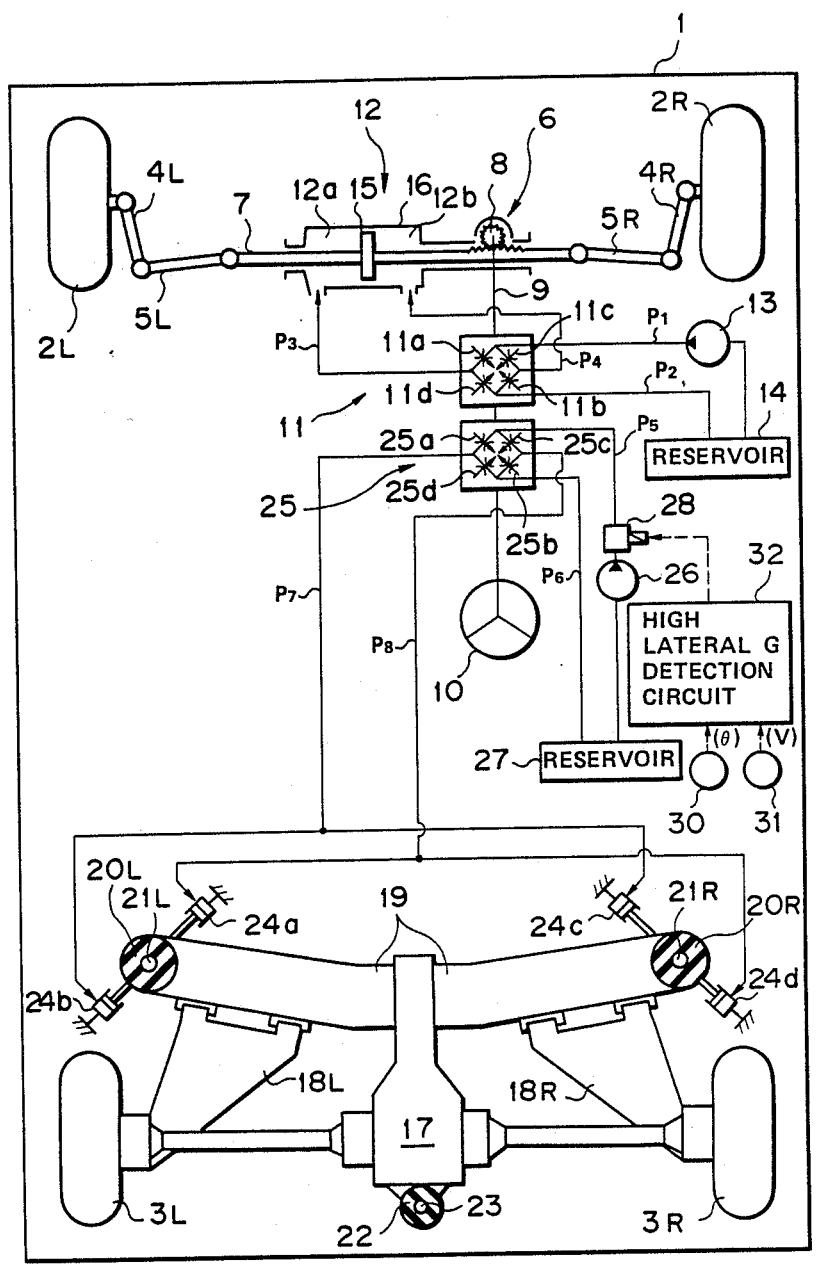
FIG. 4 is a schematic view of a vehicle for showing second embodiment of the present invention.
Figure 5:
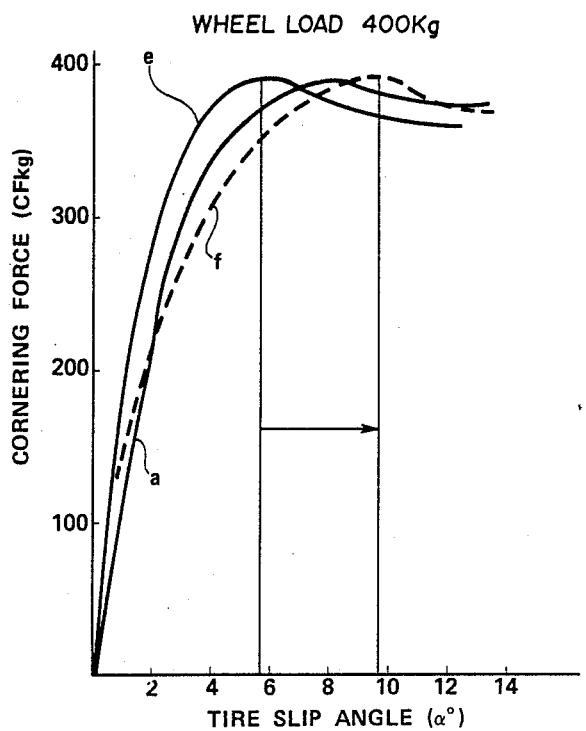
FIG. 5 is a graph showing tire characteristics employed in the second embodiment.

A second embodiment of the present invention is shown in FIGS. 4 and 5.

As shown in FIG. 4, the front and rear wheel steering systems of the vehicle of the second embodiment are substantially identical to those of the first embodiment.

In the second embodiment, the tire characteristic of the front wheels 2L and 2R is substantially the same as that of the first embodiment. Each of the front wheels 2L and 2R of the second embodiment is equipped with a tire having a characteristic a of FIG. 5 which is substantially the same as the characteristic a of FIG. 2. However, the tire characteristic of the rear wheels is different between the first and second embodiments. In the second embodiment, each of the rear wheels 3L and 3R is equipped with a tire having a characteristic e shown in FIG. 5. That is, the maximum cornering force generating slip angle of the rear wheel tires is smaller than that of the front wheel tires, and the cornering power of the rear wheel tires is greater than that of the front wheel tires. In the second embodiment, the tire characteristic of the rear wheels is adapted to the tire requirements in cornering at low lateral acceleration. Therefore, the performances in cornering at low lateral acceleration are improved by the inherent characteristic of the rear wheel tires.

Figure 6:
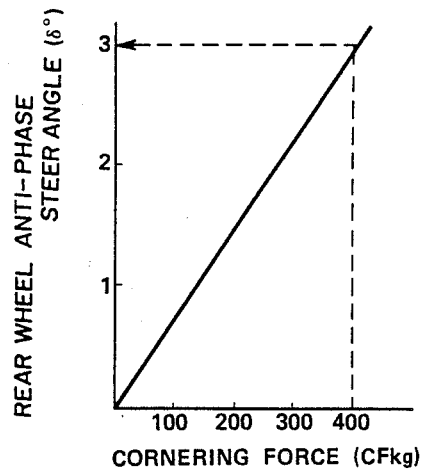
FIG. 6 is a graph showing a relationship between the cornering force and the rear wheel steer angle, used to determine the rear wheel steer angle in the second embodiment.

The tire characteristic employed for the rear wheels in the second embodiment is not suitable when the lateral acceleration is high. When the lateral acceleration increases, the rear wheel tires having such a characteristic readily become insufficient in ability of grip because of their low maximum cornering force generating slip angle, so that the possibility of spin is increased. The control system of the second embodiment is arranged to solve this problem by adjusting the tire characteristic of the rear wheels from the curve e of FIG. 5 to an equivalent curve f of FIG. 5. In the characteristic f of FIG. 5, the tire slip angle at which the cornering force becomes greatest is sufficiently increased. The control system of the second embodiment is arranged to obtain the characteristic f by steering the rear wheels 3L and 3R in an anti-phase direction opposite to the steering direction of the front wheels through 3 degrees as shown in FIG. 6.

Unlike the first embodiment, the passage $P_7$ of the second embodiment is connected to the actuator 24b and 24c, and the passage $P_8$ is connected to the actuators 24a and 24d, as shown in FIG. 4. The strokes of all the actuators 24a–24d are determined so that the rear wheel steer angle can be made equal to 3°. The control system of the second embodiment has a high lateral G detection circuit 32 instead of the low lateral G detection circuit 29. The high lateral G detection circuit 32 is connected with the control valve 38 so that the control valve 38 can be switched on and off by the high lateral G detection circuit 32. The high lateral G detection circuit 32 is further connected with the steering angle sensor 30 and the vehicle speed sensor 31. By using the steering angle $\theta$ sensed by the sensor 30 and the vehicle speed V sensed by the sensor 31, the high lateral G detection circuit 32 determines whether the vehicle is in a cornering motion having a high lateral acceleration such that the rear wheel cornering force CF is equal to or higher than a predetermined value which is 100 kg in this example. When the cornering force is equal to greater than the predetermined value, the high lateral G detection circuit 32 switches on the control valve 28 and supplies the oil discharged from the pump 26 to the passage $P_5$.

The high lateral G detection circuit 32 of the second embodiment is arranged to determine the vehicle motion variable such as the lateral acceleration or the front or rear wheel cornering force, from the steering angle $\theta$ and the vehicle speed V, and adjust the rear wheel tire characteristic when the motion variable is in a predetermined high range.

It is possible to prevent an abrupt change in the rear tire characteristic and to adjust the rear tire characteristic smoothly by varying the rear wheel steer angle continuously and smoothly in accordance with the lateral acceleration or the cornering force.

When the lateral acceleration is low, the high lateral G detection circuit 32 of the second embodiment holds the passage $P_5$ in the non-pressure state by turning off the valve 28, so that the rear wheels 3L and 3R are not steered but held in the neutral position. Therefore, the control system of the second embodiment can provide satisfactory cornering performances by the combination of the ideal characteristic a of the front wheel tires and the characteristic e of the rear wheel tires which is small in the maximum cornering force generating slip angle and great in the cornering power, as shown in FIG. 5.

When, on the other hand, the lateral acceleration is high, the high lateral G detection circuit 32 turns the valve 28 on, and supplies the oil from the pump 26 to the passage $P_5$. Therefore, the rear wheel steering control valve 25 holds the passages $P_7$ and $P_8$ in the non-pressure state when the front wheels are not steered, increases the pressure in the passage $P_8$ when the front wheels are steered in the rightward direction, and increases the pressure in the passage $P_7$ when the front wheels are steered in the leftward direction. When the front wheels are steered in the rightward direction, the pressure developed in the passage $P_8$ causes the actuators 24a and 24d to move to their limit positions, so that the rear wheels are steered in the anti-phase direction, that is in the leftward direction, and the rear wheel steer angle is made equal to 3°. When the front wheels are steered in the leftward direction the pressure developed in the passage $P_7$ causes the actuators 24b and 24c to move to their limit positions, so that the rear wheels are steered in the rightward direction opposite to the steering direction of the front wheels through 3 degrees. Consequently, the tire characteristic of the rear wheels is changed from the curve e in FIG. 5 to a broken line f in FIG. 5, so that the maximum cornering force generating slip angle is increased, and the cornering power is decreased. In this way, the control system of the second embodiment reduces the possibility of spin of the vehicle when the lateral acceleration is high.

In general, a tire characteristic having a great cornering power drops rapidly after the cornering force reaches its maximum valve. That is, the rate of decrease of the cornering force with respect to increase in the tire slip angle is high in the tire slip angle range over the maximum cornering force generating slip angle. In the second embodiment, the initial tire characteristic of the rear wheels has a great cornering power, and the maximum cornering force generating slip angle is increased when the lateral acceleration is high. Therefore, the tire characteristic obtained by the adjustment of the second embodiment tends to drop rapidly after the maximum cornering force s reached, so that there is a possibility that the vehicle falls into spin abruptly rear the critical point. In contrast to this, there is no such a fear of spin in the first embodiment in which the cornering power of the initial tire characteristic of the rear wheels is set low in agreement with the requirements in cornering at high lateral acceleration, and the maximum cornering force generating slip angle is decreased when the lateral acceleration is low. Furthermore, the first embodiment is advantageous in that the object can be attained by steering the rear wheels in the in-phase direction through a small angle as compared with the second embodiment.

In the first and second embodiments, it is desirable that the outside diameter of the front wheel tires is substantially equal to that of the rear wheel tires because a single spare tire can be easily used for both of the front and rear wheel tires.

Figure 7:
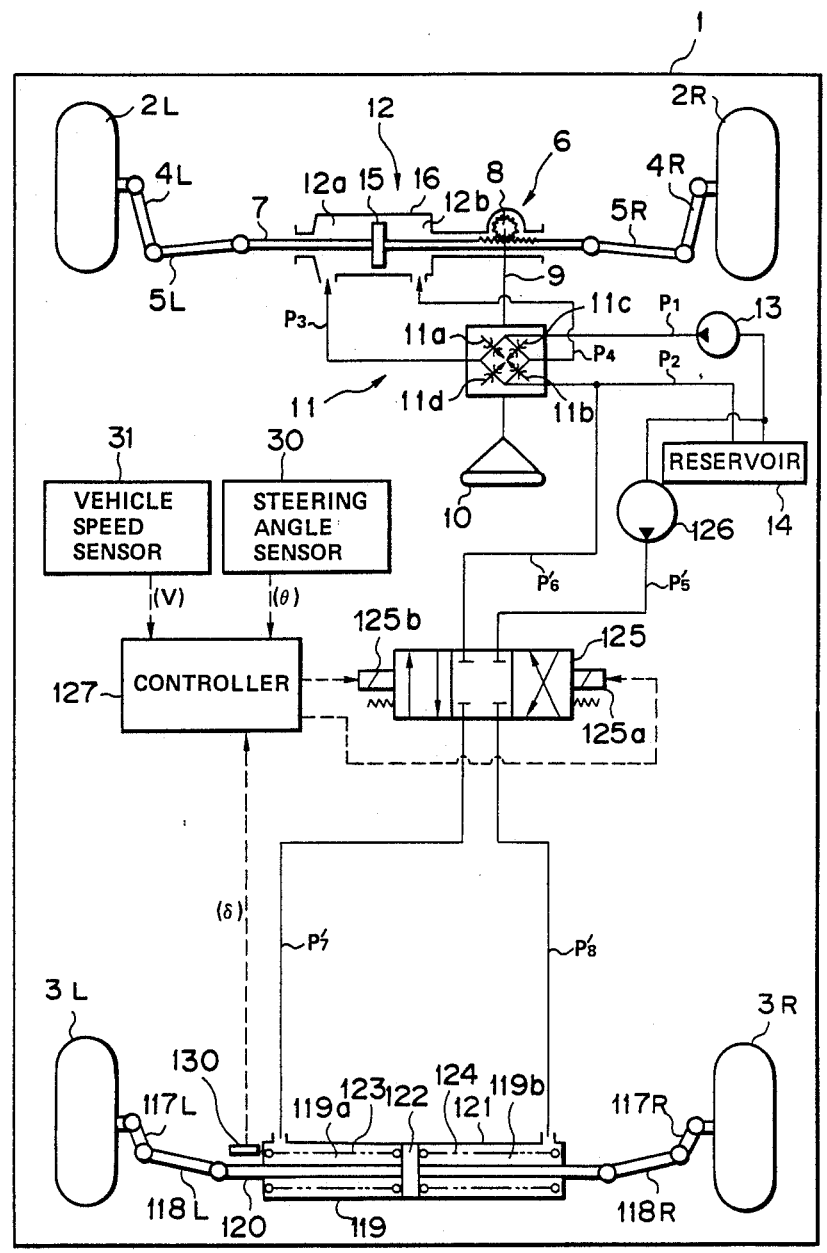
FIG. 7 is a schematic view of a vehicle for showing a third embodiment of the present invention.
Figure 8:
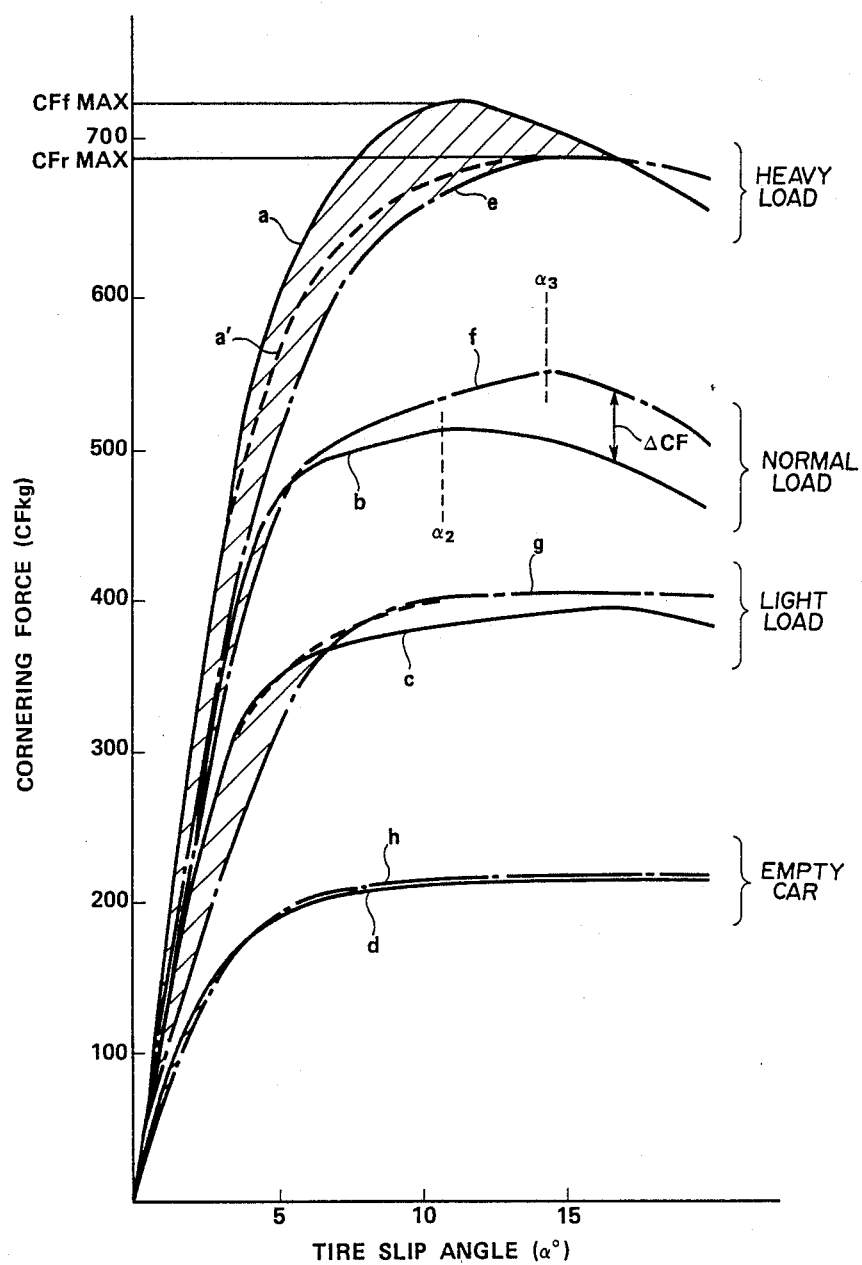
FIG. 8 is a graph showing tire characteristics employed in the third embodiment.
Figure 9:
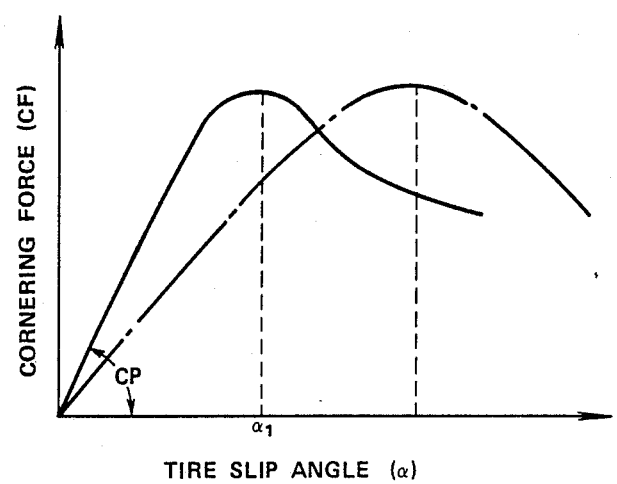
FIG. 9 is a graph showing typical tire characteristics.

A third embodiment of the present invention is shown in FIGS. 7 and 8.

In the third embodiment, the tire requirements in a large tire slip angle range are satisfied by selecting the front and rear wheel tires so that the maximum cornering force generating tire slip angle of the rear wheel tires is greater than that of the front wheel tires. In this case, the cornering power of the rear wheel tires tends to be insufficient in a small tire slip angle range, so that the response and stability of the vehicle are poor, and it is difficult to settle the vehicle behavior (vid. Nissan Giho, 1983, Vol. 19, pages 22–40, an article on influences of rear suspension characteristics on improvements of handling). Therefore, the control system of the third embodiment is arranged to steer the rear wheels in such a direction as to increase the rear wheel cornering force in the slip angle range in which the front wheel cornering force is greater than the rear wheel cornering force.

The front wheel steering system of the third embodiment is substantially identical to that of the first embodiment shown in FIG. 1.

In the rear wheel steering system of FIG. 7, the rear wheels 3L and 3R are supported on the vehicle body 1 in a steerable manner, and left and right knuckle arms 117L and 117R of the rear wheels are connected, respectively, to both ends of a rod 120 of a rear wheel steering actuator 119 through left and right side rods 118L and 118R. The actuator 119 has a cylinder body 121 fixed to the vehicle body 1, and a piston 122 slidably received in the cylinder body 121. The piston 122 divides the bore of the cylinder body 121 into left and right power chambers 119a and 119b, and moves left and right together with the rod 120. The piston 122 is normally held at its middle position by left and right springs 123 and 124 disposed on both sides of the piston 122. When the piston 122 is at the middle position, the rear wheels 3L and 3R are held at the straight ahead position.

The left and right power chambers 119a and 119b are connected to a rear wheel steering control valve 125 by left and right passages $P_7^!$ and $P_8^!$, respectively. A pressure supply passage $P_5^!$ and a drain passage $P_6^!$ connects the rear wheel steering control valve 125 to a pressure source which is constituted by a pump 126 and the reservoir 14. The rear wheel steering control valve 125 of the third embodiment is a spring-centered, three-position electromagnetic valve serving as a servo valve. The valve 125 has solenoids 125a and 125b. When both of the solenoids 125a and 125b are deenergized, both of the passages $P_7^!$ and $P_8^!$ are disconnected from the supply and drain passages $P_5^!$ and $P_6^!$, as shown in FIG. 7. When the solenoid 125a is energized, the left passage $P_7^!$ is connected with the supply passage $P_5^!$, and the right passage $P_8^!$ is connected with the drain passage $P_6^!$. When the solenoid 125b is energized, the left passage $P_7^!$ is connected with the drain passage $P_6^!$, and the right passage $P_8^!$ is connected with the supply passage $P_5^!$.

There is further provided a controller 127 for energizing and deenergizing the solenoids 125a and 125b of the control valve 125. The controller 127 is connected with the steering angle sensor 30 for sensing the steering angle $\theta$ of the steering wheel 10, and the vehicle speed sensor 31 for sensing the speed V of the vehicle. The controller 127 is further connected with a rear wheel steer angle sensor 130 for sensing a rear wheel steer angle by sensing the stroke of the rod 120.

In the third embodiment, each of the front wheels 2L and 2R is equipped with a tire which exhibits characteristics a, b, c and d in various load conditions as shown in FIG. 8. That is, the maximum cornering force generating slip angle of the front wheel tires is relatively small, and the cornering power of the front wheel tires is relatively great. On the other hand, each of the rear wheels 3L and 3R is equipped with a tire having characteristics e,f,g and h shown in FIG. 8. That is, each rear wheel is equipped with a tire having a relatively large maximum cornering force generating slip angle. Such tire characteristics can be obtained by reducing the rigidity of the embedded steel belts or reducing the rigidity of the bead wires of the tires.

In the characteristics of the normal load condition, for example, the cornering power is equal to 130 kg/deg in the front wheel tires, and equal to 115 kg/deg in the rear wheel tires, and the maximum cornering force generating slip angle is equal to 11 degrees ($\alpha_2 = 11°$) in the front wheel tires, and equal to 14.5 degrees in the rear wheel tires ($\alpha_3 = 14.5°$).

By using the vehicle lateral acceleration or yaw rate estimated from the vehicle speed V, the steering angle $\theta$ and an angular speed $\dot\theta$ of the steering angle, the controller 127 discriminates a first tire slip angle range shown by hatching in FIG. 8 for each of the load conditions. The first tire slip angle range of each of the load conditions is the range of the front or rear wheel tire slip angle in which the cornering force of the front wheel tires is greater than the cornering force of the rear wheel tires. A second tire slip angle range as distinguished from the first range is the range of the tire slip angle in which the cornering force of the front wheel tires is smaller than that of the rear wheel tires. In each of the load conditions, the controller 127 discriminates the first slip angle range from the second range, and steers the rear wheels 3L and 3R in the in-phase direction, i.e. the same direction as the steering direction of the front wheels 2L and 2R, by controlling the solenoids 125a and 125b of the control valve 125 so as to increase the cornering force of the rear wheel tires in the first slip angle range. That is, the rear wheels 3L and 3R are steered in the in-phase direction in the first slip angle range so as to make the rear wheel tire characteristic e (f-h) approximately equal to the front wheel tire characteristic a (b-d).

In the heavy load condition, the maximum cornering force CFfMAX which can be produced in the front wheels is greater than the maximum cornering force CFrMAX which can be produced in the rear wheels, as shown in FIG. 8. In this case, it is difficult because of the tire properties to make the rear wheel cornering force equal to the front wheel cornering force by steering the rear wheels. Therefore, it is advisable to set a pseudocharacteristic a' of the front wheel tires whose maximum cornering force is equal to or smaller than the maximum rear wheel cornering force CFrMAX, as shown in FIG. 8, and to steer the rear wheels so as to cause the rear wheel tire characteristic e to approach this pseudo-characteristic a'. By steering the rear wheels in the way, the control system can vary the tire characteristic smoothly.

It is possible to discriminate the first slip angle range by using a means for directly sensing the front or rear wheel cornering force, or by using a gyro for determining the tire slip angle, instead of the sensors 30 and 31.

The control system of the third embodiment is operated as follows:

When the steering wheel 10 is not turned, the control valve 11 makes the opening degrees of all the orifices 11a-11d equal to one another. Therefore, the control valve 11 holds the passages P₃ and P₄ in the non-pressure state by returning the whole quantity of the oil discharged from the pump 13 into the passage P₁, directly to the reservoir 14 through the passage P₂. In this state, the power cylinder 12 remains out of action, and the front wheels 2L and 2R are held in the position for driving the vehicle straight ahead.

When the front wheels 2L and 2R are steered by the driver through the steering wheel 10 and the steering gear 6 to the right, the control valve 11 produces the pressure in the passage P₄ and drains the passage P₃ by decreasing the opening degrees of the variable orifices 11a and 11b, and increasing the opening degrees of the variable orifices 11c and 11d. Therefore, the power cylinder piston 15 is forced to the left in FIG. 7 to assist the driver's steering effort in the right direction.

When the front wheels are steered to the left, the control valve 11 develops the pressure in the passage P₃ and drains the passage P₄ by increasing the opening degrees of the variable orifices 11a and 11b and decreasing the opening degrees of the variable orifices 11c and 11d. Therefore, the power cylinder piston 15 is urged to the right, so that the driver can lightly steer the front wheels to the left.

The controller 127 discriminates the first range (shown by hatching in FIG. 8) from the vehicle speed V, the steering angle $\theta$, and the time rate $\dot\theta$ of change of the steering angle which is obtained by differentiating the steering angle. If the current state of the vehicle is in this first tire slip angle range, the controller 127 determines the rear wheel steer angle required to make the rear wheel tire characteristic equal to the front wheel tire characteristic.

In the case of left steering, the controller 127 energizes the solenoid 125a, and puts the valve 125 in the position connecting the passage $P_7^1$ with the passage $P_5^1$ and connecting the passage $P_8^1$ with the passage $P_6^1$. Therefore, the valve 125 supplies the pressurized oil to the power chamber 119a of the actuator 119, and steers the rear wheels 3L and 3R to the left by forcing the rod 120 to the right. The rear wheel steer angle $\delta$ is fed back by the sensor 130, and the controller 127 deenergizes the solenoid 125a when the difference between the rear wheel steer angle sensed by the sensor 130 and the rear wheel steer angle determined by the controller 127 is reduced to zero. With deenergization of the solenoid 125a, the control valve 125 disconnects both the passages $P_7^1$ and $P_8^1$ and from the pressure source, so that the actuator 119 holds the actual rear wheel steer angle equal to the predetermined rear wheel steer angle.

In the case of right steering, the controller 127 energizes the solenoid 125b, and causes the control valve 125 to connect the passage $P_7^1$ with the passage $P_6^1$ and the passage $P_8^1$ with the passage $P_5^1$. Therefore, the control valve 125 causes the rod 120 to move to the left by supplying the pressurized oil to the power chamber 119b, and steers the rear wheels 3L and 3R rightwardly in the in-phase direction. When the rear wheel steer angle sensed by the sensor 130 becomes equal to the rear wheel steer angle determined by the controller 127, the controller 127 deenergizes the solenoid 125b and causes the actuator 119 to hold the actual rear wheel steer angle equal to the rear wheel steer angle determined by the controller 127.

As a result, in the first slip angle range shown by hatching in FIG. 8, the rear wheel tire characteristic is adjusted so that the rear wheel cornering force becomes equal to the front wheel cornering force. Therefore, the control system of the third embodiment can prevent shortage of the cornering power in the first slip angle range, and deterioration of the steering response notwithstanding the inherent tire characteristic of the rear wheels.

In the second slip angle range in which the tire slip angle is relatively large, the controller 127 holds the actuator 119 in the neutral position by holding the solenoids 125a and 125b in the deenergized state, so that the rear wheels 3L and 3R are held in the straight ahead position. Therefore, the rear wheel tires exhibit the inherent tire characteristic without intervention of the control system, and the maximum cornering force generating slip angle is held at a high level. Thus, the vehicle of the third embodiment can prevent shortage of gripping ability of the rear wheel tires and spin of the vehicle even in the high tire slip angle range, so that the permissible range of the yaw rate can be widened, and the steering performances near the critical point can be improved.

The following is one example of the control process of the third embodiment.

The controller 127 of this embodiment first calculates the side speed $\dot y$ and the yaw rate $\dot\phi$ of the vehicle, from the steering wheel angle $\theta$ and the vehicle speed V. For example, the yaw rate can be calculated by using a transfer function of the yaw rate with respect to the steering angle $\theta$ (as shown in Masato ABE "Sharyo no Undo to Seigyo (Motion and Control of Vehicle)", p. 75, Kyoritsu Shuppan Kabushiki Kaisha, and Nissan Giho, 1983, vol. 19, p. 23).

Then, the controller 127 of this embodiment determines the front and rear wheel cornering forces CFf and CFr from the side speed and yaw rate by using the following equations;

$$CFf = C_1\left(\frac{\theta}{N} + \frac{\dot y}{V} - a\frac{\dot\phi}{V}\right) \quad (1)$$

$$CFr = C_2\left(\frac{\dot y}{V} + b\frac{\dot\phi}{V}\right) \quad (2)$$

where N is a steering gear ratio, a is a distance between a front axle and a center of gravity of the vehicle, b is a distance between a rear axle and the center of gravity, $C_1$ is the rate of change of the front wheel cornering force with respect to the front wheel slip angle, and $C_2$ is the rate of change of the rear wheel cornering force with respect to the rear wheel slip angle. The rates $C_1$ and $C_2$ vary in accordance with the slip angle and the load of the vehicle as known from FIG. 8.

Then, the controller 127 determines whether the front wheel cornering force CFf is greater than the rear wheel cornering force CFr, or not. If it is not, the controller 127 holds the rear wheels in the straight ahead position.

If CFf is greater than Cfr, then the controller 127 calculates the rear wheel tire slip angle SAr by using;

$$SAr = \frac{\dot y}{V} + b\frac{\dot\phi}{V} \quad (3)$$

Then, the controller 127 determines a load condition of the vehicle by estimation or by using an output signal of a load sensor, connected with the controller 127, for sensing a load of the vehicle. In this embodiment, there are four load conditions as shown in FIG. 8.

In accordance with the thus determined load condition, the controller 127 select one pair of the front and rear wheel tire characteristics from the four pairs which are stored in a storage means which is included in or connected with the controller 127.

By using the selected front tire characteristic for the current load condition, the controller 127 determines a desired value of the cornering force corresponding to the rear wheel tire slip angle SAr. Then, by using the selected rear wheel tire characteristic for the current load condition, the controller 127 determines a value of the slip angle corresponding to the desired cornering force value. Then, the controller 127 sets the rear wheel steer angle equal to a difference between the slip angle calculated by the equation (3) and the slip angle of the rear tire characteristic corresponding to the desired cornering force value. Then, the controller 127 performs the feedback control to achieve the thus determined rear wheel steer angle.

In the third embodiment, the front and rear wheel tire characteristics are selected so that, under the normal load condition, the difference $\Delta CF$ between the front and rear wheel cornering forces is held almost unchanged independent of increase of the tire slip angle in the slip angle range above the maximum cornering force generating slip angle $\alpha_3$ at which the rear wheel cornering force is increased to a maximum, as shown in FIG. 8. Therefore, the vehicle of the third embodiment can improve the directional control of the vehicle near the critical point by reducing change in the behavior of the vehicle. When the front and rear wheel tire characteristics are selected so that the abovementioned difference $\Delta CF$ increases with increase of the tire slip angle, it is possible to further improve the direction control of the vehicle.

It is optional to control the rear wheel steer angle in an open loop control mode without using the rear wheel steer angle sensor 130.

In the third embodiment, too, it is desirable to make the outside diameter of the front wheel tires substantially equal to that of the rear wheel tires. Especially when a four wheel drive system is employed, front and rear wheel tires of different sizes are undesirable because a rotational speed difference between he front and rear wheels due to the difference in tire outside diameter is troublesome.

What is claimed is:

1. A vehicle comprising;
    front wheels each equipped with a front tire and rear wheels each equipped with a rear tire having a rear tire characteristic which is different from a front tire characteristic of said front tire,
    a rear wheel steering system for steering the vehicle by varying a rear wheel steer angle, and
    controlling means for adjusting said rear tire characteristic by varying said rear wheel steer angle in a predetermined first cornering condition of the vehicle, wherein each of the front and rear tire characteristic is a relationship between cornering force and tire slip angle, and the front and rear tire characteristics are different in tire slip angle at maximum cornering force which is a tire slip angle at which the cornering force is increased to a maximum.

2. A vehicle according to claim 1 wherein said controlling means comprises condition discriminating means for sensing a physical quantity indicative of a cornering behavior of the vehicle, and detecting an existence of said predetermined cornering condition from said physical quantity, and adjusting means for varying said rear wheel steer angle when there exists said predetermined cornering condition.

3. A vehicle according to claim 2 wherein said adjusting means controls said rear wheel steer angle through said rear steering system in a first mode so as to vary said time slip angle at maximum cornering force of said rear tire, when there exists said predetermined first cornering condition, and in a second mode when said first cornering condition is absent and instead there exists a second condition of the vehicle.

4. A vehicle according to claim 3 wherein said first predetermined condition exists when a rear tire slip angle is within a predetermined range.

5. A vehicle according to claim 3 wherein said first predetermined condition exists when a lateral acceleration of the vehicle is within a predetermined range.

6. A vehicle according to claim 3 wherein said adjusting means holds said rear wheels at a straight ahead position independent of variation of a front wheel steer angle in said second mode.

7. A vehicle according to claim 3 wherein each of said rear tires has said rear tire characteristic whose slip angle at maximum cornering force is greater than that of said front tire characteristic, and said adjusting means steers said rear wheels in a direction identical to a steering direction of said front wheels in said first mode.

8. A vehicle according to claim 7 wherein said condition discriminating means determines that there exists said first cornering condition when a lateral acceleration of the vehicle is lower than a predetermined value.

9. A vehicle according to claim 7 wherein said condition discriminating means determines that there exists said first cornering condition when said cornering force is lower than a predetermined value.

10. A vehicle according to claim 7 wherein said condition discriminating means determines that there exists said first cornering condition when said cornering force of said front tires is greater than said cornering force of said rear tires.

11. A vehicle according to claim 7 wherein said adjusting means holds said rear wheel steer angle constantly at a predetermined value in said first mode while said front wheels are steered in one direction.

12. A vehicle according to claim 3 wherein each of said rear tires has said rear tire characteristic whose slip angle at maximum cornering force is smaller than that of said front tire characteristic, and said adjusting means steers said rear wheels in a direction opposite to a steering direction of said front wheels in said first mode.

13. A vehicle comprising;
    front wheels each equipped with a front tire and rear wheels each equipped with a rear tire having a rear tire characteristic which is intentionally made different from a front tire characteristic of said front tire,
    a rear wheel steering system for steering the vehicle by varying a rear wheel steer angle, and
    controlling means for adjusting the rear tire characteristic by varying the rear wheel steer angle in a predetermined cornering condition of the vehicle, wherein the front and rear tire characteristics are different in cornering power.

14. A vehicle according to claim 13 wherein said controlling means comprises condition discriminating means for sensing a physical quantity indicative of cornering behavior of the vehicle, and detecting an existence of said predetermined cornering condition from said physical quantity, and adjusting means for varying said rear wheel steer angle when there exists said predetermined cornering condition.

15. A vehicle comprising;
    front wheels each equipped with a front tire, and rear wheels each equipped with a rear tire which is different from said front tire in a tire characteristic which is a relationship between cornering force and tire slip angle, a rear wheel steering system for steering the vehicle by varying a rear wheel steer angle, and controlling means for making the tire characteristic of the rear tires closer to the tire characteristic of the front tires by controlling said rear wheel steer angle in a predetermined first cornering condition.

16. A vehicle according to claim 15 wherein said adjusting means controls said rear wheel steer angle through said rear steering system in a first mode so as to make the tire characteristic of the rear tires closer to the tire characteristic of the front tires when there exists said predetermined first cornering condition, and in a second mode such that the tire characteristic of the rear tires remains different from the tire characteristic of the front tires when said first cornering condition is absent, and instead there exists a predetermined second cornering condition of the vehicle.

* * * * *